3,245,889
ELECTROLYTIC METHOD FOR PREPARING LOW
WEIGHT POLYMERS OF ACRYLONITRILE
Manuel M. Baizer, St. Louis, Mo., assignor to Monsanto
Company, a corporation of Delaware
No Drawing. Filed Feb. 25, 1963, Ser. No. 260,853
The portion of the term of the patent subsequent to
July 5, 1982, has been disclaimed
7 Claims. (Cl. 204—73)

The present invention relates to the electrolytic anionic polymerization of acrylonitrile to low molecular weight polymers and to novel low molecular weight polymers of acrylonitrile.

The terms polymerization and polymer as used herein refer to joining together of three or more molecules of acrylonitrile and are used in a board sense to include reduction or addition of protons to the joined molecules.

The process of the present invention involves electrolyzing acrylonitrile in the catholyte of a divided cell, the catholyte being a solution of fairly substantial amounts of the acrylonitrile and electrolyte salt, together with a source of protons sufficient to give only a relatively small concentration of protons. The polymerization is generally conducted in the absence of free-radical generating catalysts and in the absence of anions capable of catalyzing anionic polymerization of acrylonitrile, other than carbanions formed from the acrylonitrile itself. An inhibitor of free-radical catalysis, such as hydroquinone or p-nitrosodimethylaniline, is frequently employed in the process.

It has previously been known that acrylonitrile can be polymerized by free-radical catalysis, and also known that such free-radical catalysis can be conducted electrolytically under acid conditions. It is also known that free-radical catalysts can be generated at the anode from certain anions and can then catalyze electrolytic free-radical catalysis of acrylonitrile. However, such procedures, as well as chemical methods of initiating anionic polymerization of acrylonitrile, result in a head-to-tail type polymer:

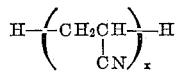

in which $x$ is a large number. In contrast to this, the polymerization of the present invention proceeds by adding two electrons to acrylonitrile at a cathode voltage (vs. saturated calomel electrode) of about $-1.65$ to $-1.9$ to obtain a dicarbanion:

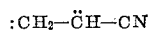

which then reacts with acrylonitrile to form

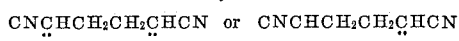

which in turn react with additional acrylonitrile to form a polymer of structure

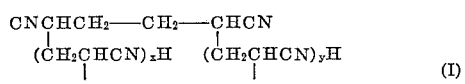

in which $x$ or $y$ may be zero and $x+y$ generally equals 10 to 26, although $x$ and $y$ can equal lower values such as when the polymer is a hydrotrimer or hydrotetramer of acrylonitrile. The polymers of molecular weights 500 to 1500 are of particular interest, especially those acetone soluble polymers having a melting range of 130 to 165° C. It will be noted that the polymer has a structure in which the initial unit has an adiponitrile structure which becomes a 1,3,6-tricyano hexane by addition of another acrylonitrile molecule, thus differing from the free-radical-catalyzed polymer in which such structure is absent.

In a process of the present type a number of competing reactions are occurring making it necessary to control concentrations to achieve the desired polymerization. The polymerization reaction can be terminated at any stage by addition of protons to the carbanions or carbanion chains involved. The concentration of protons from water or other source must be relatively low compared to the acrylonitrile concentration, if the desired low molecular weight solid polymer is to be obtained, and, in fact, must be fairly low to promote polymerization rather than reduction to propionitrile or adiponitrile. The present process is conducted in a catholyte composed of electrolyte salt, acrylonitrile and a proton source, and preferably also a co-solvent to maintain the resulting polymer in solution. The acrylonitrile constitutes at least 10% by weight of the catholyte, often around 20% to 40%, and can constitute as much as 70 to 80% of the catholyte when no co-solvent is present. The electrolyte salt always constitutes at least 5% to 10% by weight of the catholyte and generally constitutes 40 to 70% by weight of the acrylonitrile and salt, but may constitute only 20 to 25% of the acrylonitrile and salt particularly when no co-solvent is present. When water is the proton donor, it can be employed in amounts of 0.1% to 3% or up to about 5% by weight of the catholyte, amounts of 1% to 2% ordinarily being used, and the amount of water can range up to 15% or so by weight of the acrylonitrile. When substantial amounts of acetonitrile are present as co-solvent it is unnecessary to employ any water as the acetonitrile serves as a proton donor to terminate the polymerization. It is necessary to employ a co-solvent if solid polymeric product is to be obtained, solvents which are water miscible or soluble in proportions contemplated and capable of dissolving the low molecular weight polyacrylonitrile product being particularly suitable. Various polyacrylonitrile solvents can be employed such as acetonitrile, dimethylformamide, dimethylsulfoxide, dimethylsulfone, adiponitrile, etc. When only hydrotrimers or hydrotetramer products are desired, the water can range up to 10% or 20% by weight of the catholyte.

The low molecular weight polyemsr of Structure I illustrated above in which $x+y$ equals 10 to 25 are characterized by melting or softening points in the range of 130 to 165° C., compared to a decomposition range above 350° C., for ordinary high molecular weight polyacrylonitrile, and in addition have good solubility in such ordinary solvents as acetone, dimethylformamide, acetonitrile, concentrated aqueous solutions of hydrotropic quaternary ammonium salts, etc. The tractability and solubility of these polymers makes them suitable for many molding and coating applications for which high molecular weight polyacrylonitriles are not suited. The polymers can be molded at temperatures at or near their melting points, if desired with provision for cross-linking such as by esterification reaction of the cyano groups with glycols, e.g. ethylene glycol, with the aid of esterification catalysts if necessary.

The hydrotrimer produced in the present invention, 1,3,6-tricyanohexane, is a useful intermediate for the preparation of esters of 1,3,6-tricarboxyhexane and for preparation of 1,3,6-triaminohexane. The 1,3,5,8- and 1,3,6,8-tetracyanooctane of the present invention are similarly useful.

The process of the present invention is conducted in a catholyte solution of an electrolysis cell in contact with the cathode but separated by a membrane, diaphrgam or other divider from the anode of the electrolysis cell. The process does not depend upon generation of free-radicals or other initiators at the anode and it is desirable to avoid corrosion or decomposition problems resulting from presence of acrylonitrile in the anolyte.

As discussed above, the catholyte contains a concentration of electrolyte salts. As will be discussed more fully below, it is desirable to conduct the polymerization under mildly alkaline conditions and it is therefore desirable to avoid acidic salts. The salts will generally be those of strong bases, usually those of strong acids and strong bases.

In general, amine and quaternary ammonium salts are particularly suitable for use in the present process.

Among the salts which can be employed the amine and guaternary ammonium salts are generally suitable, especially those of sulfonic and alkyl sulfuric acids. Such salts can be the saturated aliphatic amine salts or heterocyclic amine salts, e.g., the mono-, di- or trialkylamine salts, or the mono-, di- or trialkanolamine salts, or the piperidine, pyrrolidine or morpholine salts, e.g., the ethylamine, dimethylamine or triisopropylamine salts of various acids, especially various sulfonic acids. Especially preferred are aliphatic and heterocyclic quaternary ammonium salts, i.e., the tetraalkylammonium or the tetraalkanolammonium salts or mixed alkyl alkanol ammonium salts such as the alkyltrialkanolammonium, the dialkyldialkanolammonium, the alkanotrialkylammonium or the N-heterocyclic N-alkyl ammonium salts of sulfonic or other suitable acids. The saturated aliphatic or heterocyclic quaternary ammonium cations in general have suitably high cathode discharge potentials for use in the present invention and readily form salts have suitably high water solubility with anions suitable for use in the electrolytes employed in the present invention. The saturated, aliphatic or heterocyclic quaternary ammonium salts are therefore in general well adapted to dissolving high amounts of acrylonitrile in their aqueous solutions and to effecting polymerization of acrylonitrile. It is understood, of course, that it is undersirable that the ammonium groups contain any reactive groups which might interfere to some extent with the polymerization reaction. In this connection it should be noted that aromatic unsaturation as such does not interfere as benzyl substituted ammonium cations can be employed; (as also can aryl sulfonate anions).

Among the anions useful in the electrolytes, the aryl and alkaryl sulfonic acids are especially suitable, for example, salts of the following acids: benzenesulfonic acid, o-, m- or p-toluenesulfonic acid, o-, m- or p-ethylbenzenesulfonic acid, o-, m- or p-cumenesulfonic acid, o-, m- or p-tert-amylbenzenesulfonic acid, o-, m- or p-hexylbenzenesulfonic acid, o-xylene-4-sulfonic acid, p-xylene-2-sulfonic acid, m-xylene-4 or 5 sulfonic acid, mesitylene-2-sulfonic acid, durene-3-sulfonic acid, pentamethylbenzenesulfonic acid, o-dipropylbenzene-4-sulfonic acid, alpha-or beta-naphthalenesulfonic acid, o-, m- or p-biphenylsulfonic acid, and alpha-methyl-beta-naphthalenesulfonic acid. The salts of various sulfonic acids may also be the saturated, aliphatic amine or heterocyclic amine salts, e.g., the mono-, di-, trialkylamine salts, or the mono-, di- or trialkanolamine salts, or the piperidine, pyrrolidine, or morpholine salts, e.g., the ethylamine, dimethylamine or triisopropylamine salt of benzenesulfonic acid or of o-, p- or m-toluenesulfonic acid; the isopropanolamine, dibutanolamine or triethanolamine salt of o-, p- or m-toluenesulfonic acid or of o-, p- or m-biphenylsulfonic acid; the piperidine salt of alpha- or beta-naphthalenesulfonic acid or of the cumenesulfonic acids; the pyrrolidine salt of o-, m-, p-amyl-benzenesulfonate; the morpholine salt of benzenesulfonic acid, of o-, m- or p-toulenesulfonic acid, or of alpha- or beta-napthalenesulfonic acid, etc. In general, the sulfonates of any of the ammonium cations disclosed generically or specifically herein can be employed in the present invention. The aliphatic sulfonates are prepared by reaction of the correspondingly substituted ammonium hydroxide with the sulfonic acid or with an acyl halide thereof. For example, by reaction of a sulfonic acid such as p-toluenesulfonic acid with a tetraalkylammonium hydroxide such as tetraethylammonium hydroxide there is obtained tetraethylammonium p-toluenesulfonate, use of which in the presently provided process has been found to give very good results. Other presently useful quaternary ammonium sulfonates are, e.g., tetraethylammonium o- or m-toluenesulfonate or benzenesulfonate; tetraethylammonium o-, m- or p-cumenesulfonate or o-, m-, or p-ethylbenzenesulfonate, tetramethylammonium benzenesulfonate, or o-, m- or p-toluenesulfonate; N,N-di-methylpiperidinium o-, m- or p-toluenesulfonate or o-, m- or p-biphenylsulfonate; tetrabutylammonium alpha- or beta-naphthalenesulfonate or o-, m- or p-toluenesulfonate; tetrapropylammonium o-, m- or p-amylbenzenesulfonate or alphaethyl-beta-naphthalenesulfonate; tetraethanolammoniuim o-, m- or p-cumenesulfonate or o-, m- or p-toluenesulfonate; tetrabutanolammonium benzenesulfonate or p-xylene-3-sulfonate; tetrapentylammonium o-, m- or p-toluenesulfonate or o-, m- or p-hexylbenzenesulfonate, tetrapentanolammonium p-cymene-3-sulfonate or benzenesulfonate; methyltriethylammonium o-, m- or p-toluenesulfonate or mesitylene-2-sulfonate; trimethylethylammonium o-xylene-4-sulfonate or o-, m- or p-toluenesulfonate; triethylpentylammonium-alpha- or beta-naphthalenesulfonate or o-, m- or p-butyl-benzenesulfonate, trimethylethanolammonium benzenesulfonate or o-, m- or p-toluenesulfonate; N,N-diethylpiperidinium or N-methylpyrrolidinium, o-, m- or p-hexylbenezenesulfonate or o-, m- or p-toluenesulfonate, N,N-di-isopropyl or N,N-dibutylmorpholinium, o-, m- or p-toluenesulfonate or o-, m- or p-binphenylsulfonate, etc.

Among the ammonium and amine sulfonates useful as electrolytes in the present invention are the alkyl, aralkyl, and heterocyclic amine and ammonium sulfonates, in which ordinarily the individual substituents on the nitrogen atom contain no more than 10 atoms, and usually the amine or ammonium radical contains from 3 to 20 carbon atoms. It will be understood, of course, that di- and poly-amines and di- and poly-ammonium radicals are operable and included by the terms amine and ammonium. The sulfonate radical can be from aryl, alkyl, arkaryl or aralkyl sulfonic acids of various molecular weights up to for example 20 carbon atoms, preferably about 6 to 20 carbon atoms, and can include one, two or more sulfonate groups.

Another especially suitable class of salts for use in the present invention are the alkylsulfate salts such as methosulfate salts, particularly the amine and quaternary ammonium methosulfate salts. Methosulfate salts such as the methyltriethylammonium tri-n-propylmethylammonium, triamylmethylammonium, tri-n-butylmethylammonium, etc., are verey hygroscopic, and the tri-n-butylmethylammonium in particular forms very concentrated aqueous solutions which dissolve large amounts of organic materials. In general the amine and ammonium cations suitable for use in the alkylsulfate salts are the same as those for the sulfonates.

Various other cations are suitable for use in the present invention, e.g., tetraalkylphosphonium and trialkylsulfonium cations, particularly from sulfonate salts of sulfonic acids described above.

The process of the present invention can be conducted at various current densities but it is ordinarily desirable to have at least 0.5 to 1 amperes/square decimeter of cathode surface to produce polymer at any significant rate and 2 to 10 or more amperes/square decimeter will ordinarily be employed, and for large scale production 20 to 50 or 100 or more amperes/square decimeter might be more suitable. The molecular weight of the polymer is affected to some extent by and bears an inverse relationship to the current density and this can be considered along with other factors and conditions affecting molecular weight in selecting the current density for use. It will be recognized that to obtain substantial current densities without employing excessive voltages it is necessary that the electrolysis medium and cell have reasonably low electrical resistances which requires the presence of substantial amounts of the electrolyte salts and preferably some water.

For the anolyte in the cell employed in the present invention various electrolyte materials known to the art are suitable and can be employed. As the polymerization reaction occurs in the cathode chamber, there can be considerable variation in the choice of anolyte without greatly affecting the process. If desired, the same medium can be employed as both catholyte and anolyte, although it frequently is desirable to avoid the presence of acrylonitrile and organic solvents in the anolyte because of possible anodic reactions. It is often desirable to use a completely aqueous salt solution in the anolyte, and generally convenient to employ the same salt therein as in the catholyte. Generally the anolyte solution will be fairly concentrated to minimize migration of water to the catholyte, and to some extent variations in the amount of water in the anolyte are considered in determining the proper amount of water for employment in the catholyte. However, an Alundum cup has been found sufficient as a divider to provide control of water migration and various ion exchange resin membranes will be even more efficient in this regard. For reasons discussed hereinbelow, it is desirable that the catholyte in the present process be non-acidic, but this it not true of the anolyte. The anolyte can be acidic, or acids can be employed as anolyte, so long as the ion exchange membrane or other diaphragm separating the catholyte and anolyte prevents excessive migration of acid or hydrogen ions to the catholyte, and, in fact, there may be advantages in permitting some leakage or migration to counteract alkalinity developed at the cathode as the electrolysis proceeds.

Acrylonitrile is subject to free-radical polymerization when subjected to electrolysis under acidic conditions, resulting in the production of high molecular weight polyacrylonitrile. Such a reaction occurs circa −1.5 cathode volts (vs. saturated calomel electrode) while the polymerization according to the mechanism described herein occurs at about −1.7 to about 1.9 cathode volts (vs. saturated calomel electrode). In order to achieve the desired polymerization to low molecular weight polymers it is essential to avoid acidic conditions causing the free-radical type polymerization and generally necessary to employ a catholyte of pH in the range above 7, although the use of rapidly circulating electrolyte makes it feasible to use slightly lower pH's, such as down to 6 or so or under some conditions and at some current densities even down to 3. It is generally advisable to employ inhibitors for inhibiting free-radical polymerization, for example, hydroquinone, p-t-butyl catechol, quinone, p-nitrosodimethylaniline, di-t-butyl hydroquinone, 2,5-dihydroxy-1,4-benzoquinone, 1,4-naphthoquinone, chloranil, 9,10-phenanthraquinone, 4-amino-1-naphthol, etc., particularly if the catholyte is acidic. The inhibitors are ordinarily used in small amounts, e.g., less than 1% by weight based on the acrylonitrile, for example 0.01% by weight based on the acrylonitrile, but can be used in larger amounts such as up to 5% or more by weight based on the acrylonitrile. It is also desirable to avoid excessively alkaline conditions, such as pH's over 12, in order to minimize undesirable side reactions, and the process will preferably be conducted at a pH in the range of about 7 to about 9.5.

Materials suitable for constructing the electrolysis cell employed in the present process are well known to those skilled in the art. The electrodes can be of any suitable cathode and anode material. The anode may be of virtually any conductor, although it will usually be advantageous to employ those that are relatively inert or attacked or corroded only slowly by the electrolytes; suitable anodes are, for example, platinum, carbon, gold, nickel, nickel silicide, Duriron, lead, and lead-antimony and lead-copper alloys, and alloys of various of the foregoing and other metals.

Any suitable material can be employed as cathode, various metals and alloys being known to the art. It is generally advantageous to employ metals of fairly high hydrogen overvoltage in order to promote current efficiency and minimize generation of hydrogen during the electrolysis. In general, it will be desirable to employ cathodes having overvoltages at least about as great as that of copper, as determined in a 2 N sulfuric acid solution at current density of 1 milliamp/square centimeter (Carman, Chemical Constitution and Properties of Engineering Materials, Edward Arnold and Co., London, 1949, page 290). Suitable electrode materials include, for example, mercury, cadmium, tin, zinc, bismuth, lead, graphite, aluminum, nickel, stainless steel, etc., in general those of higher overvoltage being preferred. It will be realized that overvoltage can vary with the type of surface and prior history of the metal as well as with other factors; therefore the term overvoltage as used herein with respect to copper as a gauge has reference to the overvoltage under the conditions of use in electrolysis.

In the cell employed in the present invention it may be advisable to employ an ion exchange resin membrane as the cell divider rather than an ordinary porous material, particularly a permselective membrane.

The cation-exchange resins which are preferred for use in such membranes are those of the sulfonic and carboxylic types, many of which are available commercially, such as sulfonated phenolaldehyde products, sulfonated cross-linked polymers of styrene, and carboxylic resins such as typified by those included in U.S. Patents Nos. 2,340,110 and 2,340,111, or any of the resins disclosed as suitable for such membranes in Juda et al., Reissue Patent 24,865. For example, a cationic membrane comprised of a sulfonated styrene-divinyl benzene polymer supported upon a glass fiber or fabric material can be employed. In general the cation permselective membranes employed comprise a solid polymeric matrix with at least 1 milliequivalent per dry gram of membrane of dissociable ionic groups, e.g., acid groups such as carboxylate groups, fixed into said matrix, said membrane being reinforced by an embedded non-corrodible material. A suitable polymer of the indicated type is the sulfonated styrene divinyl benzene copolymer described under the name "Dowex 50" in the Journal of the American Chemical Society, volume 69, page 2830 (1947). Various other types of exchange materials can be employed, for example, porous film cast from a homogeneous mixture of 70–90% by weight of vinyl chloride-acrylonitrile copolymer and 30–10% by weight of a water-soluble poly-(vinyl benzyl trialkylammonium salt); membranes of sulfonated vinyl chloride polymers and copolymers; polyacrylic membranes and membranes of other olefinic acid polymers, and other addition polymers of carboxylic acids, carboxylic anhydrides, carboxylic esters, carboxylic amides, carboxylic chlorides, carboxylic nitriles and other compounds which contain or can be hydrolyzed to carboxyl groups; membranes of condensation polymers of methylol forming sulfonated alkyl aryl ethers with aldehydes, or of various sulfonated phenol-aldehyde resins. The membranes employed can be substantially homogeneous, uniform films of the ion exchange material, or can be uniform and intimate dispersions of such ion exchange material in a film or matrix of, for example, a polymer of a perhaloethylene such as trifluorochloroethylene or tetrafluoroethylene; or the membranes can be particles of ion exchange material formed together by the same or a different type of resin or by water-insoluble jelly-like material such as petrolatum, amorphous wax, hydrocarbon gels, etc. It is preferred that the membrane be substantially non-porous in order that it may be sufficiently permselective and will not permit too rapid movement of ions.

Example 1

In an electrolysis cell, a solution of 23.1 grams acrylonitrile containing a trace of p-nitrosodimethylaniline, 25 grams tetraethylammonium p-toluenesulfonate, 82.3 grams dimethylformamide and 2.6 grams water was used as catholyte and as anolyte a 15 ml. solution of 80% by weight of the sulfonate salt was diluted with 5 ml. water. The anolyte was placed in an Alundum cup to separate it from the catholyte in which the cup was immersed, and a platinum anode was immersed in the anolyte. As the cathode, 110 ml. mercury was employed in the jacketed glass vessel containing the catholyte. The anode and cathode were connected respectively to the positive and negative terminal of a source of direct current and the current was passed through the cell for a few minutes at an amperage of 0.1 to 0.5, and cathode voltage of $-1.5$ to $-1.6$ with no apparent reaction. The applied voltage was then increased to cause a current of 1.4 amperes, a cathode voltage of $-1.85$ and a rise in temperature of the catholyte to over 40° C. After 1.45 ampere-hours, the current was stopped and the catholyte diluted by addition to 300 ml. cold water. The polymer was collected by filtration, washed with water and dried to a weight of 13.1 grams, M.P. 115–140° C. The polymer had a molecular weight (osometric) of 714 and analysis, C, 66.24; H, 6.20; N, 25.15, indicating a molecule of ca. 14 acrylonitrile units (with a hydrogen atom added at each end): $H(C_3H_3N)_{14}H$. The polymer was soluble in acetone, acetonitrile, concentrated hydrochloric acid and acetic anhydride.

When the procedure of Example 1 was repeated but employing acetonitrile rather than dimethylformamide as co-solvent, the polymer did not separate from the aqueous bath, indicating that the acetonitrile together with the water in the catholyte provided sufficient protons to terminate the polymerization at a very early stage.

Example 2

A catholyte was formed containing 23.1 grams acrylonitrile (with a trace of p-nitrosodimethylaniline), 25 grams tetraethylammonium p-toluenesulfonate, 82.3 grams dimethylformamide and 4 grams water and an anolyte from 12 grams of the same salt and 8 grams water. Electrolysis was conducted with 110 ml. Hg as cathode (55 square centimeters area) at 1 to 1.5 amperes for about 1.5 ampere-hours, 1.6 ml. acetic acid being slowly added during the electrolysis to keep the catholyte from becoming much more alkaline. The catholyte was added to 300 ml. cold water to precipitate the polymer which was separated by filtration and dried to 3.9 grams, M.P. 133° (capillary, all molten).

Example 3

Electrolysis was conducted under the same conditions as in Example 1 except that the current was about 1 ampere and the electrolysis was conducted for about 1.65 ampere-hours. A 7 gram amount of polymer was obtained, M.W. 922. The polymer was soluble in acetone and various other solvents, as well as in 94% solution of methyltributylammonium p-toluenesulfonate or 82% solution of methyltributylammonium methylsulfate in water.

Example 4

An electrolysis was run as in Example 3 except for the use of a higher catholyte temperature to lower the electrical resistance and cause a higher current flow which was about 1–1.5 amperes at about 60° C., for 1.3 ampere-hours during the one-hour electrolysis period. The resulting polymer had a molecular weight of 832.

Example 5

In an electrolysis cell, 108 grams acrylonitrile (containing inhibitor), 27 grams tetraethylammonium p-toluenesulfonate and 2.7 grams water was employed as catholyte and an 85% by weight solution of methyltriethylammonium methylsulfate was employed as anolyte. The cathode voltage was above $-1.75$ (vs. saturated calomel electrode) and the current about 1–1.2 amperes for 1.9 ampere-hours. The catholyte was diluted with water and the upper layer separated and then combined with methylene dichloride extracts of the lower layer. Upon distillation a yellow viscous material was obtained at 162–182° C., 0.28–0.38 mm., $n_D^{25}$ 1.4641, M.W. 144.

*Analysis.*—Found, C, 66.55; H, 7.16; N, 24.84, indicating a polymer of formula $(CH_2CH_2CN)_n$.

Example 6

It had been noted in a number of cases that the current, at a given applied voltage, tended to decrease as the electrolytic polymerization proceeded. An electrolysis was therefore conducted under the same conditions as Example 1 except that additional acrylonitrile and water were slowly added to the catholyte during the electrolysis, 10 ml. acrylonitrile being added in the first 20 minutes, and 2.6 ml. water in the next 45 minutes. The current decreased somewhat during the acrylonitrile addition, but increased with the addition of water, the average current being near 1.5 amperes for 2.8 ampere-hours in the 2-hour electrolysis. A 12 gram amount of polymer was obtained, M.W. 734. The addition of water and acrylonitrile, preferably at rates corresponding to the rate at which they are utilized in the reaction, is useful in controlling the reaction to produce a polymer of narrow molecular weight distribution and in preventing undue increases in the electrical resistance as the polymerization proceeds.

Example 7

A different power source was employed to maintain a constant current of 1 ampere during a 4.5 hour electrolysis with concentrations and conditions otherwise as in Example 1. The resulting acetone-soluble polymer, 21.7 grams, had a molecular weight of 929, softened at 130° C., and was liquid at about 180° C.

Example 8

In an electrolysis cell, a solution of 38.6 grams acrylonitrile (with inhibitor), 41.8 grams tetraethylammonium p-toluenesulfonate, 137.4 grams dimethylformamide, and 4 grams water was employed as catholyte, and 25 ml. 92% methyltributylammonium p-toluenesulfonate diluted with 20 ml. water as anolyte. The applied voltage was about 17 volts to give an amperage of 1 for about 5 ampere-hours, the cathode voltage being $-1.78$ to $-1.88$ (vs. saturated calomel electrode). The catholyte was poured into 750 ml. water and about 10 grams polyacrylonitrile was isolated therefrom.

Example 9

An electrolysis was run with the catholyte in Example 8, except only 3 grams water was used, and the anolyte was 30 ml. of the 92% salt solution diluted with 15 ml. water. The catholyte was heated to 40 C., and current of 1.5 amperes commenced. During the electrolysis 5 ml. samples were taken from the catholyte at about half-hour intervals, a total of 6 samples being taken during the approximately four hour electrolysis (6.37 ampere-hours). Immediately after taking each of the third fourth and fifth samples, 4 to 8 gram amounts of acrylonitrile were added. At the end of the electrolysis, 32.5 grams of polymer was isolated from the catholyte. The samples removed during the electrolysis had melting points and molecular weights as follows, and the total and incremental polyacrylonitrile production was as indicated:

| Time from Start, Minutes | Total Polymer, gr. | Incremental Polymer, gr. | M.P., °C. | Molecular Weight |
| --- | --- | --- | --- | --- |
| 30 | 7.46 | 7.46 | 134–60 | 703 |
| 60 | 16.7 | 9.25 | 134–60 | 688 |
| 90 | 22.4 | 5.75 | 106–37 | 670 |
| 120 | 26.9 | 4.45 | 104–40 | 591 |
| 150 | 27.3 | 0.40 | 142–64 | 674 |
| 180 | 29.0 | 1.70 | 142–64 | 886 |

As the incremental polymer figures indicate, the polymer production rate decreased with time. Moreover, the addition of 3.7 grams more water in a similar run resulted in production of only a very small amount of polymer.

*Example 10*

In an electrolysis, 40 grams acrylonitrile, 42 grams tetraethylammonium p-toluenesulfonate, and 132 grams anhydrous acetonitrile were employed as catholyte and the anolyte consisted of the sulfonate salt dissolved in anhydrous acetonitrile with 1 ml. water added. The electrolysis was run at applied voltages of 30 to 65 with amperage of 1.5 to 0.7 amperes for 2.5 ampere-hours From the catholyte 18.9 grams polymer was isolated, molecular weight 982.

*Example 11*

An electrolysis was conducted with a catholyte of 60 grams tetraethylammonium p-toluenesulfonate, 3 grams water and 160 grams acrylonitrile, and an anolyte of 30 ml. 82% methyltributylammonium methylsulfate diluted with 200 ml. water. A current of 1.5 to 2.0 amperes was passed from 3.5 ampere-hours. The catholyte was diluted with water and extracted with methylene dichloride. A liquid residue isolated from the extracts was distilled, a 4.3 gram fraction having B.P. 150–180° C./0.25 mm., $n_D^{25}$ 1.4670, M.W. 145.

*Analysis.*—Found: C, 65.76; H, 7.15; N, 24.86.

The high boiling oils obtained in different electrolyses of acrylonitrile were collected. One portion boiling 134–178°/0.2 mm. was isolated by extracting the catholyte of Example 6 with methylene dichloride. Another was obtained from electrolysis of acrylonitrile in 91% quaternary ammonium sulfonate without a co-solvent. Still other portions were obtained in the residues of electrolytic adiponitrile preparations. The oils were combined and then separated by distillation, one liquid boiling 186–200°/0.2 mm. and the second, 264/0.05 to 288/0.18 mm. Analysis indicated the first to be a hydrotrimer, 1, 3,6-tricyanohexane, which was confirmed by preparation of derivatives.

*Analysis.*—Calc'd. for $C_9H_{11}N_3$: C, 67.05; H, 6.88; N, 26.07; mol. wt., 161.2. Found: C, 66.81; H, 7.02; N, 24.72.

Hydrolysis yielded 1,3,6-tricarboxyhexane, M.P. 112° compared to the reported 111–112° C.

*Analysis.*—Calcd. for $C_9H_{14}O_6$: C, 49.54; H, 6.47; neutr. equiv. 72.7. Found: C, 49.40; H, 6.55; neutr. equiv 73.2.

A sample of the tricarboxyhexane showed no depression in melting point when mixed with 1,3,6-tricarboxyhexane obtained by the novel procedure of preparing diethyl alpha-(3-cyanopropyl), alpha-(2-cyanoethyl) malonate from alpha-(3-cyanopropyl) malonate and acrylonitrile, and hydrolyzing with concentrated hydrochloric acid. The higher boiling oil above was shown by analysis to be acrylonitrile hydrotetramer, which could be formulated as 1,3,5,8-tetracyanooctane, or 1,3,6,8-tetracyanooctane in accordance with the generic structural Formula I above, $x+y$ equaling 2. The tetraethyl esters corresponding to both of these structures were independently prepared and compared with the tetraethyl esters obtained by hydrolysis and esterification of the hydrotetramer, and both nuclear magnetic resonance and vapor phase chromatographic examination showed the esters from the hydrotetramer to be mixtures of those obtained from the two structures. The 1,3,6,8-tetracarbethoxyoctane was obtained by cyanoethylating tetraethyl 1,1,4,4-butanetetracarboxylate with acrylonitrile in caustic methanol to form tetraethyl, 1,4 - bis(2-cyanoethyl)-1,1,4,4-butanetetracarboxylate, hydrolyzing with concentrated hydrochloric acid, esterifying with ethanol sulfuric acid, and fractionating, 166–184°/0.08–0.10 mm. $n_D^{25}$ 1.4480.

*Analysis.*—Found: C, 59.41; H, 8.43.

The 1,3,5,8-tetracarbethoxyoctane was obtained by base catalyzed addition of diethyl alpha-(2-cyanoethyl) malonate to methyl alpha-(3-cyanopropyl) acrylate to form 1,8 - dicyano-3,3-dicarbethoxy-5-carbmethoxyoctane, followed by hydrolysis with concentrated dihydrochloric acid and esterification with ethanol sulfuric acid. Upon distillation the vapor fraction was obtained at 180°/0.3 mm. to 182°/0.25 mm., $n_D^{25}$ 1.4770.

*Analysis.*—Found: C, 59.46; H, 8.21.

The 1,4 - bis(2-cyanoethyl)-1,1,4,4-butanetetracarboxylate intermediate above was crystallized from t-butylalcohol, M.P. 93–94°.

*Analysis.*—Calc'd. for $C_{22}H_{32}N_2O_8$: C, 58.39; H, 7.13; N, 6.19. Found: C, 58.24; H, 7.17; N, 6.15.

The hydrotrimers and hydrotetramers disclosed herein can, as disclosed, be converted to the corresponding acid and various esters thereof, and serve as useful intermediates for the production of such acids and esters. The hydrotrimers and hydrotetramers can be converted to the corresponding amines by hydrogenation over cobalt catalyst in the same manner that adiponitrile is converted to hexamethylene diamine, and the resulting tri- and tetra-amines will be useful as cloth or paper substantive materials for various finishing purposes, improving the hand thereof, dyeing properties and the like. Moreover, the tri- and tetra-amines will be useful for cross-linking purposes in the preparation of polyamides from polyamines and polycarboxylic acids. The novel tri- and tetra-cyano compounds and their derivatives differ from their isomers not only in physical properties such as boiling points, melting points, etc., and properties of resinous or other materials produced therefrom, but the presently disclosed tri-cyano and tetra-cyano compounds can be produced in a simple one-step procedure from acrylonitrile, while the isomeric compounds require multi-step procedures, for acrylonitrile polymerization to effect their production cannot be sufficiently controlled.

The electrolytic polymerizations of the present invention are to some extent reversible, depending upon concentrations of the components and other factors; a reversal is possibly initiated by quaternary ammonium hydroxide formed at the cathode, and acrylonitrile separated from the polymer by electrolytic cleavage can be reduced to propionitrile if a sufficient concentration of water is present, rather than again polymerizing. Thus it is possible by suitable choice of concentrations to electrolytically degrade polyacrylonitrile to lower molecular weight material. For example, a polyacrylonitrile of molecular weight about 950 when used in an amount of 23.2 grams with like amounts of water and tetraethylammonium p-toluenesulfonate and 78.7 grams dimethylformamide was degraded by a current of 1 ampere at cathode voltage of —1.7 to —1.8 (vs. saturated calomel electrode) to polymer of molecular weight 784.

*Analysis.*—Found: C, 65.95; H, 6.34; N, 25.39; and infrared analysis indicated the presence of primary and secondary amide groups as well as the characteristic structure of the electrolytically produced polymers.

In effecting such degradation it may be desirable to have the water constitute about 10 to 50% or so by weight of the catholyte, or weights about equivalent to the acrylonitrile weight may be employed.

What is claimed is:

1. The method of preparing low molecular weight polymers of acrylonitrile by electrolytic cathodic initiation which comprises electrolyzing a solution in contact with a cathode, the said solution containing acrylonitrile, at least about 5% by weight of salts selected from the group consisting of quaternary ammonium aromatic sulfonates and quaternary ammonium aromatic alkyl sulfates, and water in an amount constituting 0.1% to 5% by weight of the acrylonitrile, the solution being free of free-radical generating catalysts and free of anions capable of catalyzing anionic polymerization of acrylonitrile other than anions produced from acrylonitrile, and the solution comprising at least 10% by weight acrylonitrile, the electrolysis being conducted at a cathode voltage in the range of $-1.75$ to $-1.95$ volts (vs. saturated calomel electrode), and separating the resulting polymer formed from at least three molecules of acrylonitrile from the solution.

2. The method of claim 1 in which the solution contains dimethylformamide.

3. The method of preparing hydrotrimers and hydrotetramers of acrylonitrile which comprises electrolyzing in contact with a cathode a solution of acrylonitrile, at least 5% by weight of a salt selected from the group consisting of quaternary ammonium aromatic sulfonates and quaternary ammonium alkyl sulfates, and an amount of water constituting no more than 5% by weight of the solution, and the acrylonitrile constituting at least about 10% by weight of the solution and separating hydrotrimers and hydrotetramers from the solution.

4. The method of claim 3 in which a solvent selected from the group consisting of dimethylformamide, acetonitrile and dimethyl sulfoxide is also present.

5. The method of claim 1 in which the quaternary ammonium salt constitutes 40% to 70% by weight of the acrylonitrile and the quaternary ammonium salt.

6. The method of claim 1 in which a current greater than 1 ampere is employed, the cathode voltage is in the range of $-1.65$ to $-1.9$ volts, and a free-radical polymerization inhibitor is present.

7. The method of claim 1 in which the polymers have molecular weights of 500 to 1500.

References Cited by the Examiner

UNITED STATES PATENTS

| | | | |
|---|---|---|---|
| 2,564,102 | 8/1951 | Fawcett et al. | 260—465.8 |
| 2,632,729 | 3/1953 | Woodman | 204—72 |
| 2,726,204 | 12/1955 | Park et al. | 204—72 |
| 2,916,511 | 12/1959 | Frazza et al. | 260—465.6 |

FOREIGN PATENTS 566,274    11/1958    Canada.

JOHN H. MACK, *Primary Examiner.*

MURRAY TILLMAN, *Examiner.*

H. M. FLOURNOY, *Assistant Examiner.*